(12) United States Patent
Williams et al.

(10) Patent No.: US 12,385,583 B2
(45) Date of Patent: Aug. 12, 2025

(54) VALVE COUPLING ASSEMBLY

(71) Applicant: NORMA GERMANY GMBH, Maintal (DE)

(72) Inventors: Gary Williams, Maintal (DE); Viktor Stoll, Maintal (DE); David Peterson, Maintal (DE); Przemyslaw Lyson, Maintal (DE); Chris Hands, Maintal (DE); Daniel Kintea, Maintal (DE)

(73) Assignee: NORMA GERMANY GMBH, Maintal (DE)

( * ) Notice: Subject to any disclaimer, the term of this patent is extended or adjusted under 35 U.S.C. 154(b) by 0 days.

(21) Appl. No.: 18/568,936

(22) PCT Filed: May 18, 2022

(86) PCT No.: PCT/EP2022/063445
§ 371 (c)(1),
(2) Date: Dec. 11, 2023

(87) PCT Pub. No.: WO2022/258330
PCT Pub. Date: Dec. 15, 2022

(65) Prior Publication Data
US 2024/0271735 A1 Aug. 15, 2024

(30) Foreign Application Priority Data
Jun. 10, 2021 (DE) .................... 10 2021 114 971.1

(51) Int. Cl.
*F16L 29/04* (2006.01)
*F16L 37/36* (2006.01)
(52) U.S. Cl.
CPC .............. *F16L 29/04* (2013.01); *F16L 37/36* (2013.01)

(58) Field of Classification Search
CPC . F16L 29/04; F16L 29/02; F16L 37/32; F16L 37/36; F16L 37/44
See application file for complete search history.

(56) References Cited

U.S. PATENT DOCUMENTS 2,461,818 A * 2/1949 Hague ................... F16L 37/096
137/614
2,471,237 A 5/1949 Pasturczak
(Continued)

FOREIGN PATENT DOCUMENTS

| IT | TO20110799 A1 | 3/2013 | |
|---|---|---|---|
| KR | 20170119242 A * | 10/2017 | |
| WO | WO-2014087187 A1 * | 6/2014 | ............. F16L 37/23 |

OTHER PUBLICATIONS

International Search Report for International Application No. PCT/EP2022/063445 dated Jul. 22, 2022 (5 pages).

*Primary Examiner* — David Colon-Morales
(74) *Attorney, Agent, or Firm* — REISING ETHINGTON, P.C.

(57) ABSTRACT

A valve coupling assembly has a first fluid line connector coupled to a first fluid line and a second fluid line connector coupled to a second fluid line. In an operational state, the first and second fluid line connectors are engaged to each other for fluid communication between the first and second fluid lines. In a disengaged state, the first and second fluid line connectors are disengaged wherein the first and second fluid lines are disconnected. A first valve arranged in the first fluid line connector is configured to control a fluid flow in the first fluid line. In a closed state of the first valve, the first fluid line is sealed, and, in an open state of the first valve, the first fluid line is open. The second fluid line connector comprises at least one push element mounted to a body of the second fluid line connector.

11 Claims, 4 Drawing Sheets

(56) References Cited

U.S. PATENT DOCUMENTS

| | | | | |
|---|---|---|---|---|
| 2,504,569 | A * | 4/1950 | Murphy | F16L 29/04 |
| | | | | 137/614.04 |
| 2,968,497 | A * | 1/1961 | Treleman | F16L 29/02 |
| | | | | 251/149.4 |
| 3,289,699 | A * | 12/1966 | Westveer | F16L 37/113 |
| | | | | 137/614.03 |
| 3,446,245 | A * | 5/1969 | Snyder, Jr. | F16L 15/008 |
| | | | | 285/276 |
| 3,613,726 | A * | 10/1971 | Torres | F16L 37/23 |
| | | | | 285/86 |
| 6,170,522 | B1 * | 1/2001 | Tanida | F16L 39/00 |
| | | | | 137/614.04 |
| 6,202,690 | B1 * | 3/2001 | Smith, III | F16L 37/32 |
| | | | | 137/614.04 |
| 6,347,785 | B1 * | 2/2002 | Copp | B67D 7/0294 |
| | | | | 137/614.04 |
| 6,637,725 | B2 * | 10/2003 | Davis | F16L 37/413 |
| | | | | 137/614.04 |
| 7,044,441 | B2 * | 5/2006 | Doyle | A61M 39/26 |
| | | | | 251/149.6 |
| 7,578,312 | B2 * | 8/2009 | Smith, III | F16L 1/26 |
| | | | | 137/614.04 |
| 7,762,279 | B2 * | 7/2010 | Zeiber | F16L 29/04 |
| | | | | 251/149.6 |
| 9,291,293 | B2 * | 3/2016 | Prust | F16L 37/35 |
| 10,865,916 | B2 * | 12/2020 | Tivelli | F16L 29/04 |
| 11,326,728 | B2 * | 5/2022 | Ma | F16L 37/252 |
| 11,655,924 | B2 * | 5/2023 | Ramaswamy | F16L 29/04 |
| | | | | 251/149.6 |

* cited by examiner

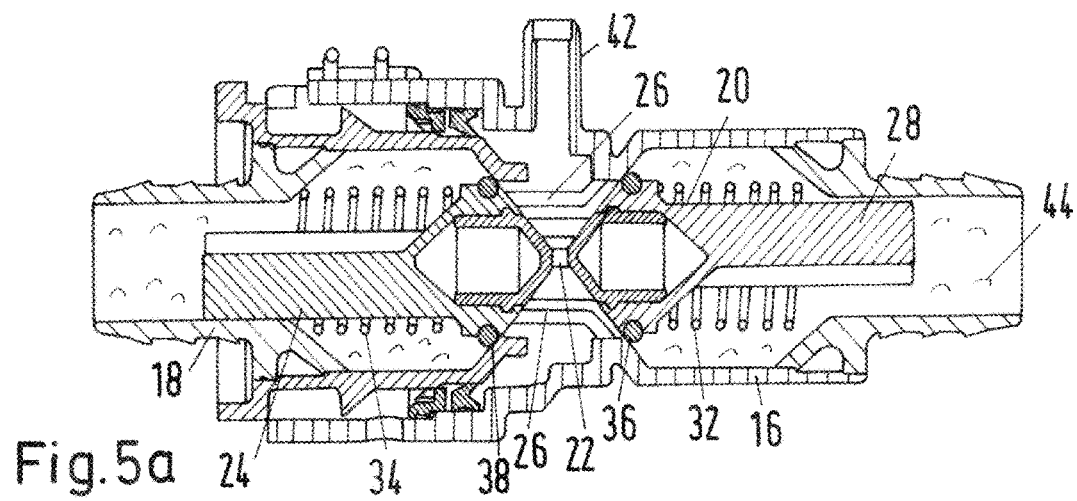
Fig.5a
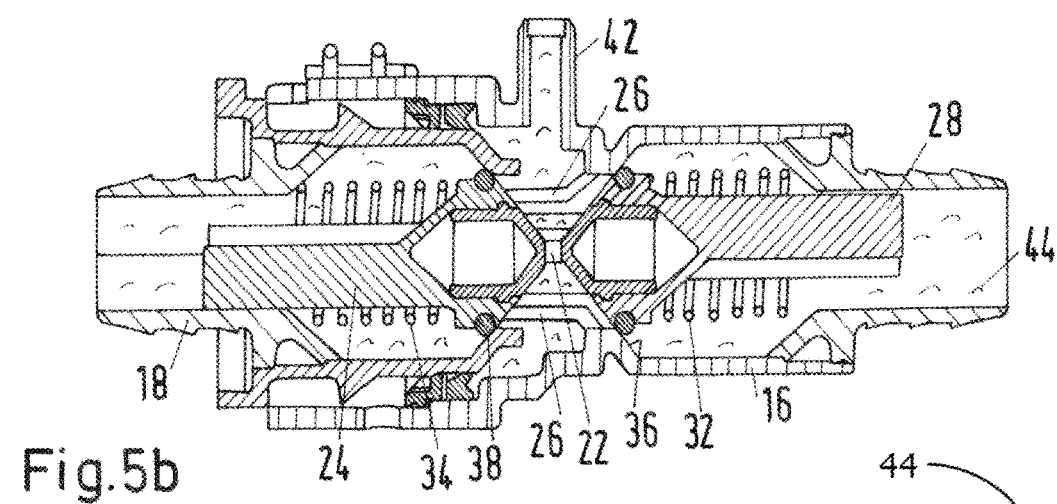
Fig.5b
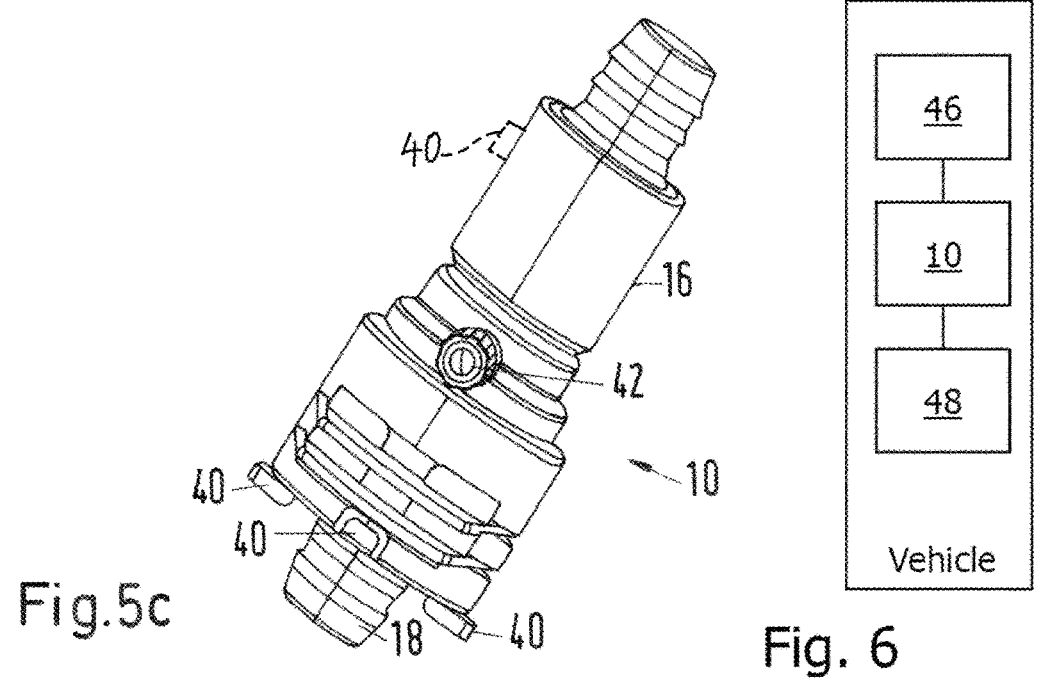
Fig.5c
Fig. 6

VALVE COUPLING ASSEMBLY

INTRODUCTION

The disclosure relates to a valve coupling assembly.

Coupling assemblies may be used for connecting fluid lines, particularly in vehicles. When maintenance is required on a fluid line system, the coupling assembly is disengaged. This leads to a significant loss of fluid that flows out of the disengaged fluid lines. Air replaces the lost fluid in the disengaged fluid lines and the coupling assembly. Before re-using after maintenance, the air trapped in the fluid line and the coupling assembly must be removed to avoid malfunctions.

The use of valve coupling assemblies can avoid the loss of fluid and thus the trapping of air. Those coupling assembly comprise of two coupling halves each containing a valve. The valves comprise pistons that are arranged in the fluid channel of the valves. When the valve coupling assembly is separated, e.g. during maintenance, the springs push the pistons on the valve seat to close the valves. When the valve coupling assemblies are coupled, e.g. during normal operation, the pistons are pushed away from the valve seats allowing fluid to flow. The pistons are configured such that when the connectors are coupled to each other along an axial direction, the pistons push each other away from a corresponding valve seat along that axial direction. This leads to an opening of each valve.

However, the total axial travel of those connectors, i.e. the distance the connectors move between their first contact and their full engagement, is split between the pistons. Thus the travel of the connectors must be the sum of the travel both pistons.

SUMMARY

Thus, a technical object per an embodiment may be providing an improved valve coupling assembly with a reduced pressure loss.

In an embodiment, a valve coupling assembly is provided, the valve coupling assembly comprising a first fluid line connector with a first fluid line and a second fluid line connector with a second fluid line, wherein in an operational state, the first fluid line connector and the second fluid line connector are engaged to each other and the first fluid line and the second fluid line are connected in fluid communication, wherein in a disengaged state, the first fluid line connector and the second fluid line connector are disengaged from each other and the first fluid line and the second fluid line are disconnected from each other, wherein a first valve is arranged in the first fluid line, the first valve being configured to control a flow of a fluid in the first fluid line, wherein, in a closed state of the first valve, the first fluid line is sealed, and, in an open state of the first valve, the first fluid line is open, wherein the second fluid line connector comprises at least one push element mounted to a body of the second fluid line connector, the push element being configured to push the first valve from the closed state to the open state when the valve coupling assembly transfers from the disengaged to the operational state, wherein, in the operational state, the push element abuts on the first valve and locks the first valve in the open state.

In the disengaged state, the first valve is in the closed state. When connecting the first fluid line connector to the second fluid line connector, the push element may push the first valve from the closed state to the open state. The push element being arranged on the second fluid line connector and the first valve being arranged on the first fluid line connector do not share any travel of the first and second fluid line connector. The total travel of the first and second fluid line connectors is available to open the first valve.

According to an example, the second fluid line connector may comprise a second valve being arranged in the second fluid line, the second valve being configured to control a flow of a fluid in the second fluid line, wherein, in a closed state of the second valve, the second fluid line is sealed, and, in an open state of the second valve, the second fluid line is open, wherein the first fluid line connector comprises at least one further push element, wherein, in the operational state, the further push element abuts on the second valve and locks the second valve in the open state.

In that example, both fluid line connectors comprise first valves for controlling the flow in the corresponding fluid lines. The first valve and the second valve may have the same functions and features. Furthermore, the first valve and the second valve may be of the same type. In the following, every function and feature that is described for the first valve may also apply to the second valve. The same applies to the push element and the further push element.

When engaging the fluid line connectors, the push element of one of the fluid line connectors opens the valve of the other fluid line connector and vice versa. The push elements may be immovably arranged on the fluid line connectors. Thus, the travel of the first and second fluid line connector does not result in a movement of the push elements. The complete travel of the fluid line connectors may be used to open each first valve. The use of the second valve and the further push element further reduces the loss of fluid in the disengaged state of the first and second fluid line connectors. The second valve seals the second fluid line connector in the disengaged state.

Furthermore, for example, the first valve may be a self-closing valve being configured to automatically transfer from the open state to the closed state if the first valve is unlocked in the open state.

The self-closing valve transitions from the open state to the closed state if no external force transfers the first valve to the open position. Thus, without any external force that acts on the first valve, the first valve will transfer or stay in the closed state.

In a further example, the push element may be a protrusion extending from the second fluid line connector to the first valve.

The protrusion may extend into the first fluid line connector when the first and second fluid line connectors are transitioned from the disengaged state to the operational state. Then, the protrusion may contact the first valve to open it by providing a pushing force parallel or along the axial direction of the first fluid line connector. The protrusion may be attached to the second fluid line connector such that the protrusion does not move in relation to the second fluid line connector. By using the protrusion, a simple and cost effective push element is provided.

For example, the first valve may comprise a first piston, a first spring and a first valve seat, the first spring being configured to push the first piston on the first valve seat, wherein in a closed state of the first valve, the first piston abuts on the first valve seat and the first fluid line is sealed, wherein in an open state of the first valve, the push element pushes the first piston away from the first valve seat and the first fluid line is open.

The spring provides a force being internal to the first valve. That force transfers the first valve to the closed state by pushing the first piston on the first valve seat. The first valve seat is arranged on the exhaust opening of the first fluid line. The first piston seals the first fluid line when being pushed on the first valve seat. This example provides a cost effective valve configuration.

In another example, the second fluid line connector comprises a plurality, preferably three, push elements.

If both, the first fluid line connector and the second fluid line connector comprise a first valve and push elements, the push elements of the first and second fluid line connector may e.g. be arranged in an opposed manner in an angular position to each other on the same radial centerlines. In another example, the push elements of the first fluid line connector may be arranged in a different distances to the axial center than the push elements of the second fluid line connector.

In a further example, the first fluid line connector may comprise a female housing, wherein the second fluid line connector comprises a male spigot corresponding to the female housing.

Furthermore, the first fluid line connector and/or the second fluid line connector may for example comprise at least one lug, wherein, in the operational state, the lug extends away from the first fluid line connector or the second fluid line connector, respectively.

If the first fluid line connector is a female housing and the second fluid line connector is a male spigot or vice versa, in the operational state, the female housing covers the male spigot but not the at least one lug. A user may therefore use the lug to disengage the male spigot from the female housing without pulling on the fluid line that is connected to the male spigot. This simplifies the handling and reduces the risk of ruptures at the fluid line during the disengagement of the first and second fluid line connectors.

In a further example, in a connected state of the first fluid line connector and the second fluid line, the first fluid line connector and the second fluid line connector may be engaged to each other and the first valve is in the closed state.

The connected state is between the disengaged state and the operational state. In the connected state, the first fluid line connector and the second fluid line connector contact each other. The push element may also contact the first valve without opening the first valve. To open the first valve, the push element must be pushed further towards the first valve, i.e. the first and second fluid line connector must be moved towards each other into the operational state.

In another example, the valve coupling assembly may further comprise a vent being configured to vent air from between the first fluid line and the second fluid line.

This further reduces the risk of malfunctions due to air in the fluid lines.

In a further example, the first fluid line connector, the second fluid line connector, the first valve, and the at least one push element comprise plastic material.

In another embodiment, a vehicle is provided comprising at least one fluid lines, and a valve coupling assembly, the valve coupling assembly connecting the at least one fluid lines to a further component of the vehicle in fluid communication.

The effects and further embodiments of the vehicle according to the present disclosure are analogous to the effects and embodiments of the valve coupling assembly according to the description mentioned above. Thus, it is referred to the above description of the valve coupling assembly.

BRIEF DESCRIPTION OF THE FIGURES

Further features, details and advantages of the disclosure result from the wording of the claims as well as from the following description of exemplary embodiments based on the drawings. The figures show:

FIG. 5a-c a schematic drawing of a valve coupling assembly with a vent; and

FIG. 6 is a schematic and block diagram view of a vehicle having a valve coupling assembly.

DETAILED DESCRIPTION

Figure 1A:
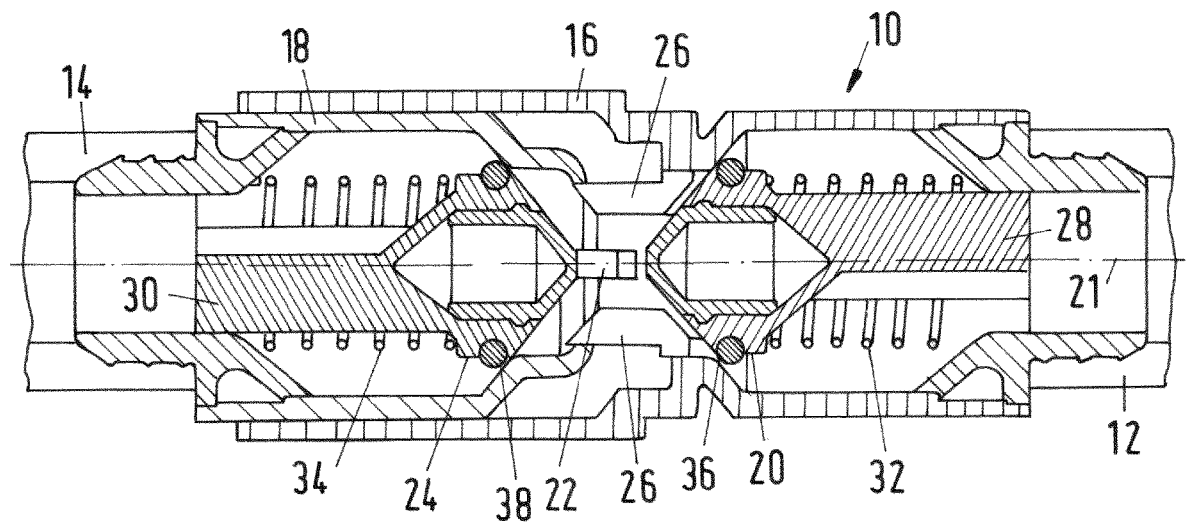
FIG. 1a, b a schematic drawing of the valve coupling assembly.

In the following description, the entirety of the valve coupling assembly is denoted with reference sign 10 as shown in FIG. 1a.

The valve coupling assembly 10 comprises a first fluid line connector 16 and a second fluid line connector 18. The first fluid line connector 16 and the second fluid line connector 18 are connectable to each other. FIG. 1a shows the disengaged state of the first fluid line connector 16 and the second fluid line connector 18.

The first fluid line connector 16 may be formed as a female housing made of plastic material. Furthermore, it is connected to a first fluid line 12.

The second fluid line connector 18 may be formed as a male spigot that corresponds to the female housing made of plastic material. It is connected to a second fluid line 14. The first fluid line 12 and the second fluid line 14 can be coupled via the first fluid line connector 16 and the second fluid line connector 18.

The first fluid line connector 16 comprises a first valve 20 that controls the flow in the first fluid line 12. This means that the first valve 20 controls whether fluid can flow in or flow out of the first fluid line 12. In a closed state of the first valve 20, the end of the first fluid line 12 at the first valve 20 is sealed. No fluid can flow through that end. In an open state of the first valve 20, that end of the first fluid line 12 is open.

The first valve 20 may comprise a first piston 28 made of plastic material, a first spring 32 and a first valve seat 36. The first valve seat 36 extends around an opening of the first fluid line connector 16. The first spring 32 is arranged such that it pushes the first piston 28 on the first valve seat 36. Therefore, the first valve 20 is a self-closing first valve that automatically transfers from the open state to the closed state. When the first piston 28 is pressed on the first valve seat 36, the opening of the first fluid line connector 16 is blocked, i.e. that opening is not in fluid communication with the first fluid line 12.

The second fluid line connector 18 comprises at least one push element 22 made of plastic material, wherein in this example, there are three push elements 22. In this example, the three push elements 22 have the same radial distance to the center of the second fluid line connector 18 and are evenly distributed around the center. In this example, the push element 22 may be formed as a protrusion extending parallel to a connection axis 21 of the valve coupling assembly. The push element 22 protrudes away from the second fluid line connector 18, the push elements 22 are affixed to the body of the second fluid line connector 18 not the first valve 20. When the first fluid line connector 16 and the second fluid line connector 18 are coupled, the push element 22 protrudes towards the first fluid line connector 16.

When moving the first fluid line connector 16 and the second fluid line connector 18 along the connection axis 21 towards each other the valve coupling assembly 10 transfers to the connected state.

In the connected state, the first fluid line connector 16 and the second fluid line connector 18 contact each other. The first valve 20 is still in the closed state. The push element 22 may contact the first valve 20.

Figure 1B:
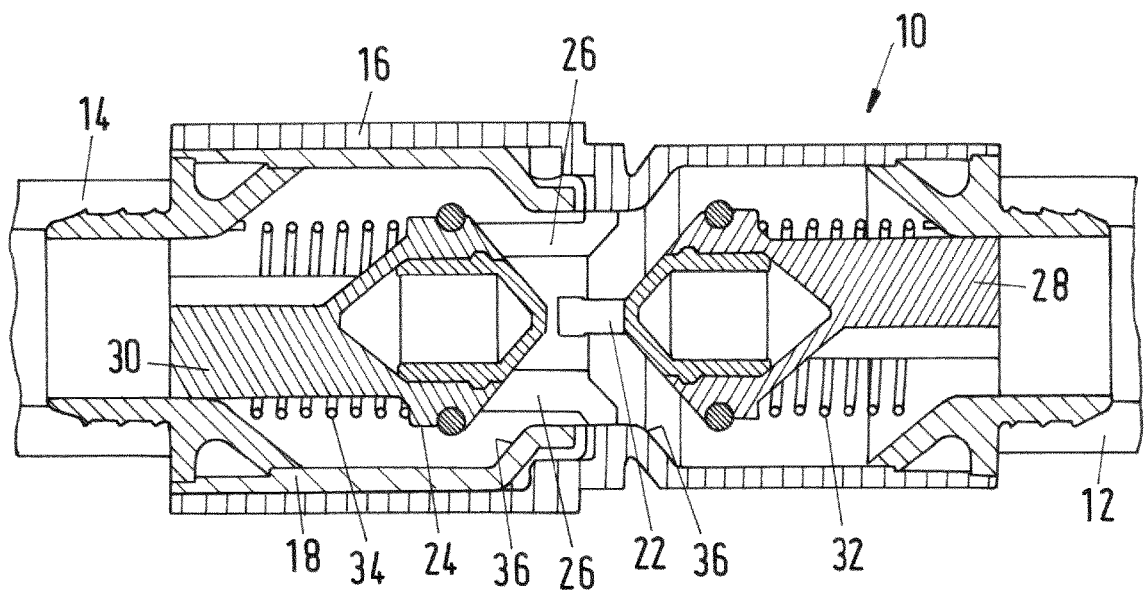

When further moving the first fluid line connector 16 and the second fluid line connector 18 towards each other, the push element 22 pushes on the first valve 20 causing the first valve 20 to transfer to the open state. Then, the valve coupling assembly is in the operational state as shown in FIG. 1b. The push element 22 may push the first piston 28 away from the first valve seat 36. The force that the push element 22 acts on the first piston 28 must be bigger than the force being caused by the first spring 32. Furthermore, the push element 22 locks the first valve 20 in the open state, i.e. the first piston 28 cannot return to the first valve seat 36 as long as the valve coupling assembly 10 is in the operational state.

The push element 22 is immobile in relation to the second fluid line connector 18. Thus, in relation to the first valve 20, the push element 22 moves the travel distance of the first fluid line connector 16. The push element 22 may therefore push the first piston 28 the full travel distance of the first fluid line connector 16 away from the first valve seat 36.

In shown example, the second fluid line connector 18 comprises a second valve 24. The second valve 24 has a second piston 30, a second spring 34 and a second valve seat 38. The second valve 24 has the same features as the first valve 20.

Furthermore, the first fluid line connector 16 comprises at least one further push element 26. The further push element 26 has the same features as the push element 22.

Figure 2:
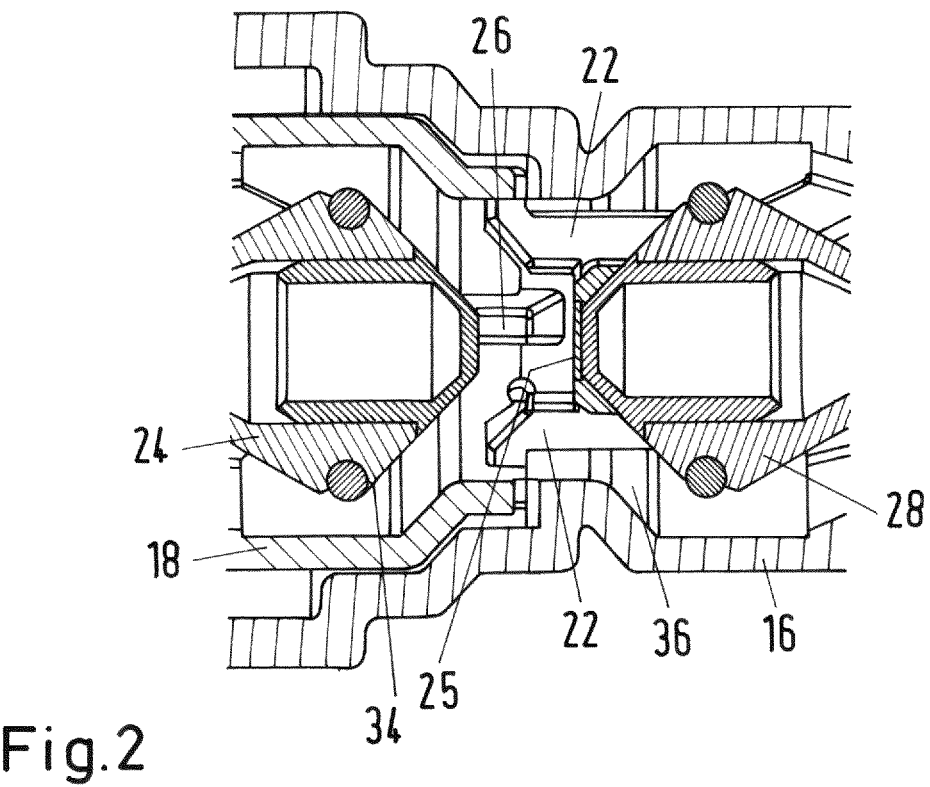
FIG. 2 a schematic drawing of another view of the valve coupling assembly.

FIG. 2 shows another view of the valve coupling assembly 10. In that view, the valve coupling assembly 10 is turned around the connection axis 21 by 60°. FIGS. 1a and 1b show only one push element 22 of the second fluid line connector 18. The second fluid line connector 18 of this example comprises three push elements. In the view of FIG. 2, two of the three push elements 22 are shown.

The three push elements 22 may be connected by a centering element 25 that is arranged on the connection axis 21. The centering element 25 may be cap-shaped and be configured to receive a portion of the first piston 28. The centering element 25 contributes to the centering of the first piston 28 when the push elements 22 push the first piston 28 away from the first valve seat 36.

Figure 3:
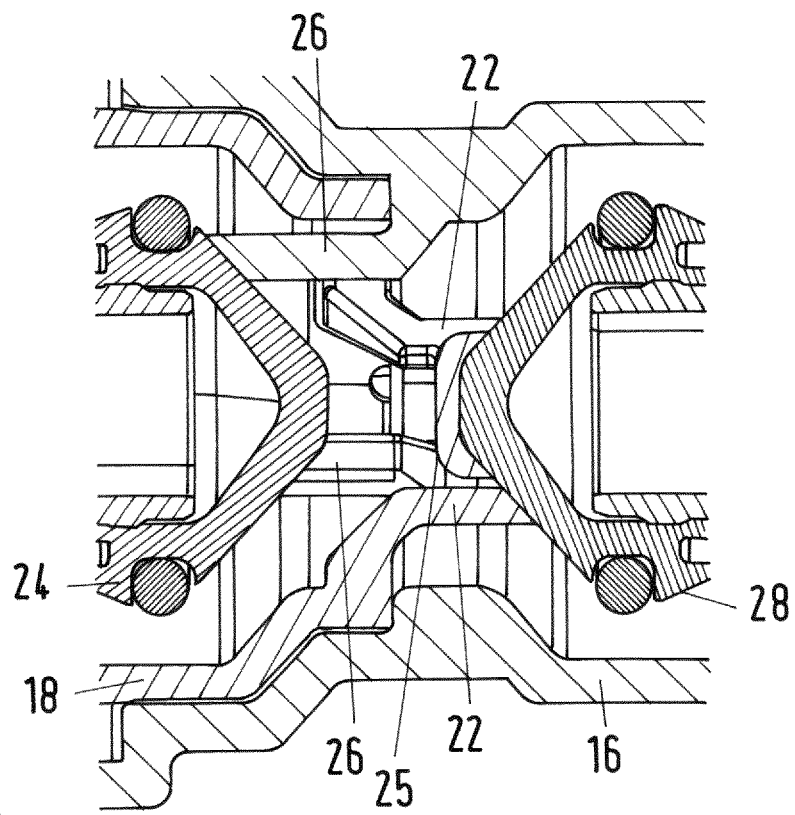
FIG. 3 a schematic drawing of a further view of the valve coupling assembly.

FIG. 3 shows another view of the valve coupling assembly 10. In that view, the valve coupling assembly 10 is turned, further. A first push element 22 and a further push element 26 are shown in a cross sectional view. The first push element 22 and the further push element 26 are arranged on opposite sides along a radial centerline. In this exemplary embodiment, each push element 22 has a further push element 26 that is arranged on an opposite side on the radial centerline.

The push element 22 and the further push elements 26 therefore can be easily moved to pass each other, when the first fluid line connector 16 and the second fluid line connector 18 are coupled.

Figure 4A:
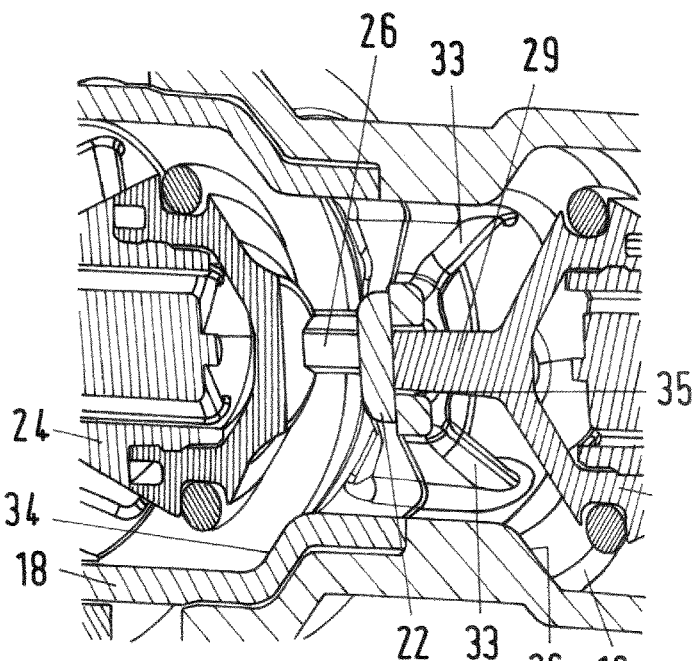
FIG. 4a-c a schematic drawing a further exemplary embodiment of the valve coupling assembly.

FIG. 4a shows a further exemplary embodiment of the valve coupling assembly 10. In this example, the push element 22 is a wall element at the second fluid line connector 18. The first valve 20 of the first fluid line connector 16 may comprises a spacer element 29 that may be arranged at the first piston 28. The spacer element 29 may be shaped as a protrusion that extends towards the wall element when the valve coupling assembly 10 is in the connected state or the operational state, respectively.

Figure 4B:
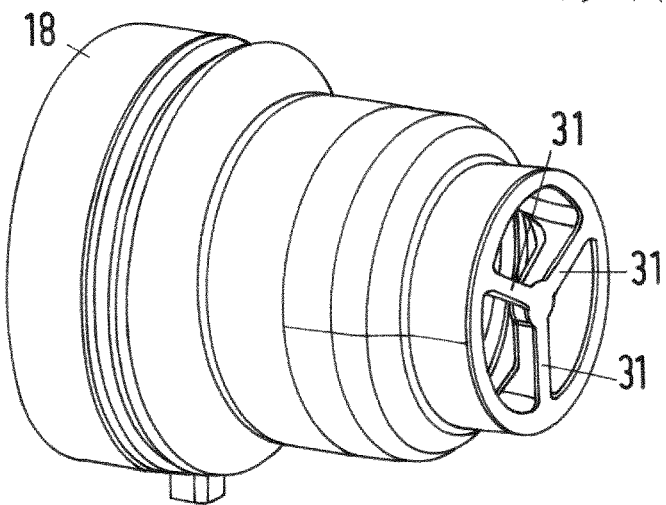

FIG. 4b shows the second fluid line connector 18 from the outside. Arms 31 may support the wall element on a position being centered on the connection axis 21. The arms 31 extend in radial direction of the connection axis 21.

Figure 4C:
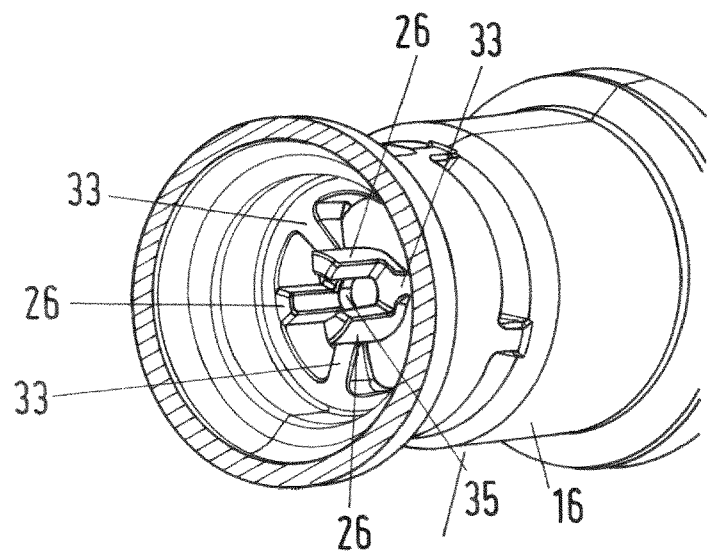

The push elements 26 of the first fluid line connector 16 may extend around the wall element in the connected state or the operational state, respectively, as indicated in FIG. 4c. FIG. 4c shows the first fluid line connector 16 with push elements 26. The push elements 26 are arranged around an opening 35 for the spacer element 29. Further arms 33 support the push elements 26. The further arms 33 extend radial to the connection axis 21.

FIGS. 5a to 5c show a further example of a valve coupling assembly 10 having a vent 42. In the connected state or the operational state, respectively, the vent 42 is in fluid communication with the space between the first valve 20 and the second valve 24.

In FIG. 5a, the valve coupling assembly 10 is in the connected state. The first valves 20, 24 are in the closed state. The first valves 20, 24 block the fluid lines 12, 14 such that fluid 44 cannot flow out. The space between the first valves is filled with air. This is the situation shortly after the first fluid line connector 16 and the second fluid line connector 18 are connected.

Before moving the first fluid line connector 16 and the second fluid line connector 18 further towards each other to open the first valves 20, 24, the air is vented through the vent 42. Fluid may be introduced in the space between the first valves 20, 24 as shown in FIG. 5b. After filling the space with fluid and placing a simple cap on the 42 vent to seal, the first fluid line connector 16 and the second fluid line connector 18 may be moved further towards each other to open the first valves 20, 24 and to transfer the valve coupling assembly 10 to the operational state.

FIG. 5c shows the valve coupling assembly 10 from an outside view. The vent 42 may be arranged on the first fluid line connector 16 which may be a female housing. The second fluid line connector 18 may be a male spigot that is covered by the female housing. The male spigot may comprise at least one lug 40 to allow separation without needing to apply load through the fluid line 14, the lug 40 extending away from the male spigot such that the lug 40 protrudes from the female housing when the male spigot is coupled to the female housing. The first fluid line connector 16 and/or the second fluid line connector 18 may for example comprise the lug 40, which is shown in dashed line format on the first fluid line connector 16.

FIG. 6 shows a vehicle 44 (in block diagrammatic form) comprising at least one fluid line 46 and the valve coupling assembly 10 wherein the valve coupling assembly 10 connects the at least one fluid line 46 to a further component 48 of the vehicle 44 in fluid communication.

The invention is not limited to one of the aforementioned embodiments. It can be modified in many ways.

All features and advantages resulting from the claims, the description and the drawing, including constructive details, spatial arrangements and procedural steps, may be essential for the invention both in themselves and in various combinations.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 10 valve coupling assembly
12 fluid line
14 fluid line
16 first fluid line connector
18 second fluid line connector
20 first valve
21 connection axis
22 push element
24 second valve
25 centering element
26 further push element
28 first
29 spacer element
30 second piston
31 arm
32 first spring
33 arm
34 second spring
35 opening
36 first valve seat
38 first valve seat
40 lug
42 vent
44 fluid
10 valve coupling assembly
12 fluid line
14 fluid line
16 first fluid line connector
18 second fluid line connector
20 first valve
21 connection axis
22 push element

The invention claimed is:

1. A valve coupling assembly comprising a first fluid line connector coupled to a first fluid line and a second fluid line connector coupled to a second fluid line, wherein in an operational state, the first fluid line connector and the second fluid line connector are engaged to each other and the first fluid line and the second fluid line are connected in fluid communication, wherein in a disengaged state, the first fluid line connector and the second fluid line connector are disengaged from each other and the first fluid line and the second fluid line are disconnected from each other, wherein a first valve is arranged in the first fluid line connector, the first valve being configured to control a flow of a fluid in the first fluid line, wherein, in a closed state of the first valve, the first fluid line is sealed, and, in an open state of the first valve, the first fluid line is open, wherein the second fluid line connector comprises at least one push element mounted to a body of the second fluid line connector, the push element being configured to push the first valve from the closed state to the open state when the valve coupling assembly transfers from the disengaged to the operational state, wherein, in the operational state, the push element abuts on the first valve and locks the first valve in the open state, wherein the second fluid line connector comprises a second valve being arranged in the second fluid line connector, the second valve being configured to control a flow of a fluid in the second fluid line, wherein, in a closed state of the second valve, the second fluid line is sealed, and, in an open state of the second valve, the second fluid line is open, wherein the first fluid line connector comprises at least one further push element mounted to a body of the first fluid line connector, wherein, in the operational state, the further push element abuts on the second valve and locks the second valve in the open state, wherein the push elements of the first and second fluid line connectors are arranged in an opposed manner in an angular position to each other on the same radial center-lines.

2. The valve coupling assembly according to claim 1, wherein the first valve is a self-closing first valve being configured to automatically transfer from the open state to the closed state if the first valve is unlocked in the open state.

3. The valve coupling assembly according to claim 1, wherein the push element is a protrusion extending from the second fluid line connector to the first valve.

4. The valve coupling assembly according to claim 1, wherein the first valve comprises a first piston, a first spring and a first valve seat, the first spring being configured to push the first piston on the first valve seat, wherein in the closed state of the first valve, the first piston abuts on the first valve seat and the first fluid line is sealed, wherein in the open state of the first valve, the push element pushes the first piston away from the first valve seat and the first fluid line is open.

5. The valve coupling assembly according to claim 1, wherein the second fluid line connector comprises a plurality of push elements.

6. The valve coupling assembly according to claim 1, wherein the first fluid line connector comprises a female housing, wherein the second fluid line connector comprises a male spigot corresponding to the female housing.

7. The valve coupling assembly according to claim 1, wherein the first fluid line connector, the second fluid line connector, or both the first and second fluid line connectors, comprises at least one lug, wherein, in the operational state, the lug extends away from the first fluid line connector, the second fluid line connector, or both of the first and second fluid line connectors.

8. The valve coupling assembly according to claim 1, wherein in a connected state of the first fluid line connector and the second fluid line, the first fluid line connector and the second fluid line connector are engaged to each other and the first valve is in the closed state.

9. The valve coupling assembly according to claim 1, wherein the valve coupling assembly further comprises a vent being configured to vent air from between the first valve and the second valve.

10. The valve coupling assembly according to claim 1, wherein the first fluid line connector, the second fluid line connector, the first valve, and the at least one push element comprise plastic material.

11. A vehicle comprising at least one fluid line, and the valve coupling assembly according to claim 1, the valve coupling assembly connecting the at least one fluid line to a further component of the vehicle in fluid communication.

* * * * *